United States Patent
Corghi

(10) Patent No.: US 8,376,018 B2
(45) Date of Patent: Feb. 19, 2013

(54) CHUCK FOR A TYRE CHANGING MACHINE

(75) Inventor: Remo Corghi, Correggio (IT)

(73) Assignee: Corghi S.p.A., Correggio (Reggio Emilia) (IT)

( * ) Notice: Subject to any disclaimer, the term of this patent is extended or adjusted under 35 U.S.C. 154(b) by 311 days.

(21) Appl. No.: 12/671,125

(22) PCT Filed: May 29, 2008

(86) PCT No.: PCT/EP2008/056630
§ 371 (c)(1),
(2), (4) Date: Jun. 30, 2010

(87) PCT Pub. No.: WO2009/015920
PCT Pub. Date: Feb. 5, 2009

(65) Prior Publication Data
US 2010/0269982 A1    Oct. 28, 2010

(30) Foreign Application Priority Data
Jul. 30, 2007   (IT) .............................. RE2007A0091

(51) Int. Cl.
*B60C 25/00* (2006.01)
*B60B 30/06* (2006.01)
(52) U.S. Cl. .......................................... 157/16; 157/21
(58) Field of Classification Search .................... 157/16, 157/21
See application file for complete search history.

(56) References Cited

U.S. PATENT DOCUMENTS

| 6,039,104 | A  | * | 3/2000 | Cunningham et al. | 157/21 |
| 7,143,801 | B2 | * | 12/2006 | Matteucci | 157/16 |
| 7,201,204 | B2 | * | 4/2007 | Corghi et al. | 157/16 |
| 2005/0199349 | A1 | | 9/2005 | Matteucci | |

FOREIGN PATENT DOCUMENTS

EP   1657084 A   5/2006

* cited by examiner

*Primary Examiner* — David B Thomas
(74) *Attorney, Agent, or Firm* — Browdy and Neimark, PLLC

(57) ABSTRACT

A tyre-changing machine including a chuck having a self-centring group for blocking a rim of a wheel. The self-centring group includes blocking jaws of the rim arranged angularly equidistanced along a circumference centred on a rotation axis of the chuck, and links and a jack for moving for radially distancing and nearing the blocking jaws with respect to the rotation axis of the chuck to vary a diameter of the circumference on which the blocking jaws are arranged while maintaining an inclination of each blocking jaw constant with respect to the rotation axis of the chuck. Each blocking jaw includes a first portion that is connected to the links, and a second portion that is movably coupled to the first portion such as to be able to change an overall development of the blocking jaw in a radial direction with respect to the rotation axis of the chuck.

6 Claims, 4 Drawing Sheets

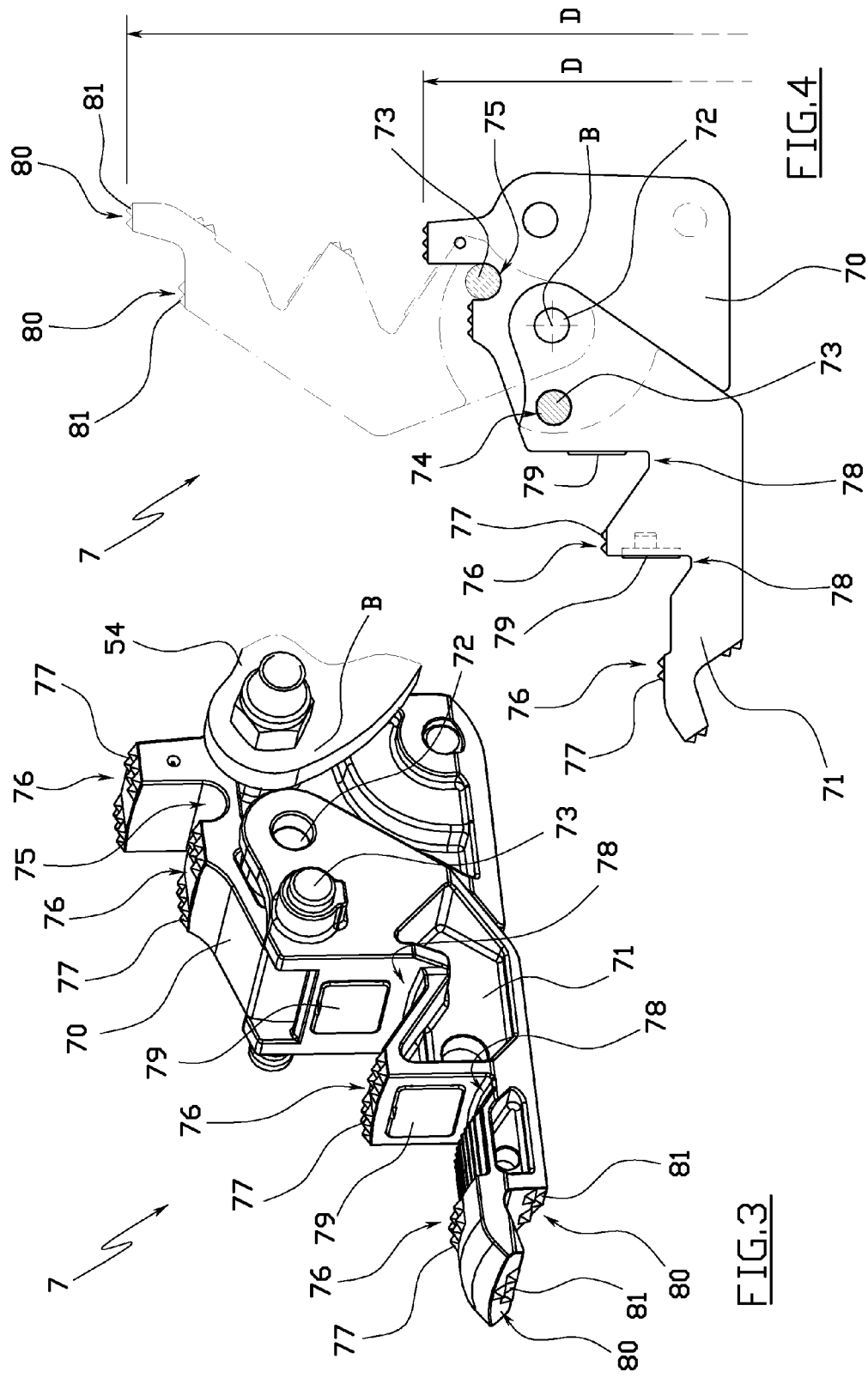

CHUCK FOR A TYRE CHANGING MACHINE

TECHNICAL FIELD

The invention relates to a tyre-changing machine for heavy vehicle wheels, which is particularly suitable for mounting and dismounting tyres of medium and large size, such as those normally mounted on vans, lorries or agricultural vehicles.

BACKGROUND ART

Tyre-changing machines for this type of application generally comprise a rotating chuck provided with a self-centring group for blocking the wheel, which rotating chuck is installed on board a first sliding carriage provided with possibility of nearing and distancing motion in relation to a second sliding carriage, which bears an operating turret provided with a work tool for acting on the wheel for performing the stages of debeading, dismounting and a subsequent mounting of the tyre on the rim.

In particular, the rotating chuck normally comprises a central support element and a plurality of mobile arms distributed about the rotation axis of the chuck, which mobile arms are hinged to the central support element according to hinge axes which lie in a perpendicular plane to the rotation axis of the chuck, and which are singly provided with a respective blocking jaw destined to remain in contact with the rim of the wheel, to block the wheel solidly.

The blocking jaws are distributed along a same circumference which is centred on the rotation axis of the chuck and are substantially step-shaped, such as to make available coupling surfaces for pressing from the inside towards the outside against the channel of the rim, or to grip the edge of the disc of the rim in order to solidly constrain the wheel to the rotating chuck.

The rotating chuck is further provided with means for moving which simultaneously open or lock the mobile arms, such as to distance or alternatively to near the blocking jaws in a radial direction, and means for maintaining the inclination of each blocking jaw constant with respect with the rotation axis of the chuck, during the radial displacements.

In this way, it is possible effectively to vary the diameter of the circumference on which the blocking jaws are distributed, both in order to enable gripping and releasing the rim and to enable the chuck to operate with rims of different diameters.

However, the above-delineated chucks are sometimes not generally able to operate with rims of very large dimensions, for example with rims of a diameter of above 52 inches, typical of tractor wheels, such that the largest opening of the mobile arms is not however sufficient for the blocking jaws to couple with the internal surfaces of the rims.

In order to block rims of these sizes, at present use is made of prolongating elements which are mounted manually on each blocking jaw by the operator, and which are designed to increase the overall radial development of the blocking jaw, such as to reach the internal surfaces of even the largest rims.

The prolongation elements are however separate accessories from the tyre-changing machine, which are used only occasionally and which thus can easily be lost or damaged. Further, the mounting and successive dismounting operations of these accessories from the blocking jaws considerably increase the equipping and preparation times of the tyre-changing machines, as well as the work and the effort required of the operators.

The aim of the present invention is to overcome the above-mentioned drawbacks in the prior art, in the ambit of a simple, rational and inexpensive solution.

The aim is attained by a tyre-changing machine having the characteristics reported in independent claim 1. The dependent claims delineate preferred or particularly advantageous aspects of the invention.

DISCLOSURE OF INVENTION

In general, the invention makes available a tyre-changing machine comprising a chuck having a self-centring device for the blocking of a wheel, which self-centring device comprises a plurality of blocking jaws of the rim arranged angularly equidistance along a circumference centred on the axis of rotation of the chuck, and means for moving for radially distancing and nearing the blocking jaws with respect to the axis of rotation of the chuck, such as to vary the diameter of the circumference on which they are arranged, keeping the inclination of each blocking jaw constant with respect to the axis of rotation of the chuck.

In the invention, each blocking jaw comprises a first portion which is connected to the means for moving, and a second portion which is coupled with possibility of motion to the first portion, such as to be able to vary the overall development of the blocking jaw in a radial direction with respect to the rotation axis of the chuck.

In this way, in order to block very large-diameter wheels, the operator has only to move the second portion of the blocking jaws with respect to the first portion, without any need to mount and dismount separate prolongation elements, thus limiting to a minimum the machine equipping and preparation time, and solving the problems connected to the possible loss of the prolongation elements.

In a preferred embodiment of the invention, each blocking jaw further comprises means for fastening for fixing the second portion in at least two operating positions with respect to the first portion, of which a position of minimum development suitable for operating with the majority of the rims, and a position of maximum radial development suitable for operating with the large rims.

Thanks to this solution, the positioning of the second portion of the jaws with respect to the first is done in a particularly simple, rapid and precise way; further, the means for fastening guarantee the stability of the blocking jaw an thus the safety of the grip on the wheel, during the performance of the stages of mounting and dismounting the tyre.

BRIEF DESCRIPTION OF THE DRAWINGS

Further characteristics and advantages of the invention will emerge from a reading of the following description, supplied by way of non-limiting example, with the aid of the figures of the drawings, illustrated in the accompanying tables, and in which:

FIG. 3 is a perspective view of a blocking jaw of the machine of FIG. 1;

FIG. 4 is a schematic lateral view of the blocking jaw of FIG. 3;

BEST MODE FOR CARRYING OUT THE INVENTION

Figure 1:
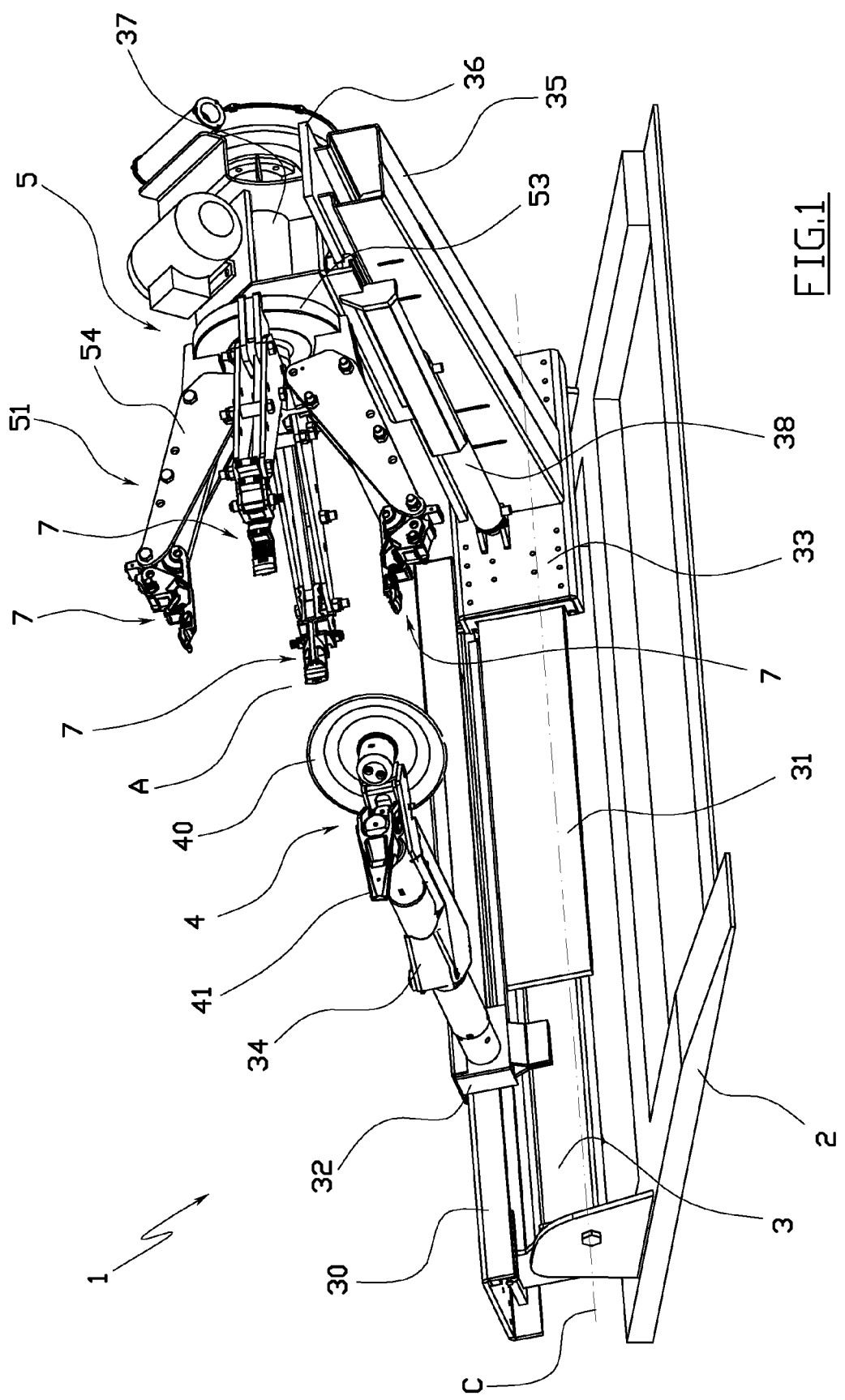
FIG. 1 is a perspective view of a tyre changing machine of the invention.

The tyre-changing machine 1 described in the following is for heavy vehicle wheels, such as for example vans, lorries or agricultural vehicles.

As illustrated in FIGS. from 5 to 7, a wheel for heavy vehicles comprises a rim 100 generally provided with a narrow radial portion 101, usually called a disc, which supports a channel-shaped substantially cylindrical portion 102, on which a tyre (not illustrated) is placed. The disc 101 can exhibit a relatively-large central hole 103 by means of which the wheel is positioned on the organs of the vehicle.

The tyre-changing machine 1 comprises a solid base 2 for resting on the ground on which a positionable support frame 3 is mounted, which is hinged to the base 2 at a horizontally-oscillating axis C, and is associated to a usual motor (not shown) for varying the inclination with respect to the base 2 itself. Two straight parallel guides 30 and 31 are fixed on board the positionable frame 3, on which respectively a carriage 32 and 33 is slidably coupled. The carriages 32 and 33 are associated to means for activating, of known type, which move them contemporaneously with alternating reciprocal nearing or distancing motion.

A tool-bearing turret 34 is mounted on the carriage 32 at the end of which turret 34 a workhead is located, denoted in its entirety by 4, which comprises a debeading disc 40 and a usual tyre-dismounting tool 41 arranged diametrically opposite with respect to the axis of the turret 34. The workhead 4 rotates about the axis of the tool-bearing turret 34, such that an operator can invert the positions of the debeading disc 40 and the tyre-dismounting tool 41.

A sturdy projecting arm 35 is mounted on the carriage 33, formed by a steel element which develops substantially parallel to the tool-bearing turret 34, and on the upper flank of which a straight guide 36 is fixed, to which a tool-bearing carriage 37 is fixed, to which a wheel-bearing carriage 37 is coupled, which slide in a longitudinal direction along the projecting arm 35, activated by a relative hydraulic jack 38.

The wheel-bearing carriage 37 comprises a hollow hub in which a chuck 5 is rotatably coupled and idle in a rotation axis A which is parallel to the axis of oscillation C of the positionable frame 3. The chuck 5 comprises an axially hollow rotating shaft 50 (see FIG. 2) which projects with respect to the wheel-bearing carriage 37 both on the side facing towards the work head 4 and towards the opposite side, where it is connected to an activating motor (not visible) by means of a chain drive.

A self-centring group 51 is mounted on the part of the rotating shaft 50 which projects towards the work head 4, which self-centring group 51 blocks a wheel, keeping it automatically fixed in a coaxial position with the rotation axis A of the chuck 5.

The self-centring group 51 comprises four identical blocking jaws 7 which are in direct pressing contact on the rim of the wheel in order to block it on the chuck 5, which jaws 7 are distributed angularly equidistant along a circumference centred on the rotation axis A of the chuck 5.

Figure 2:
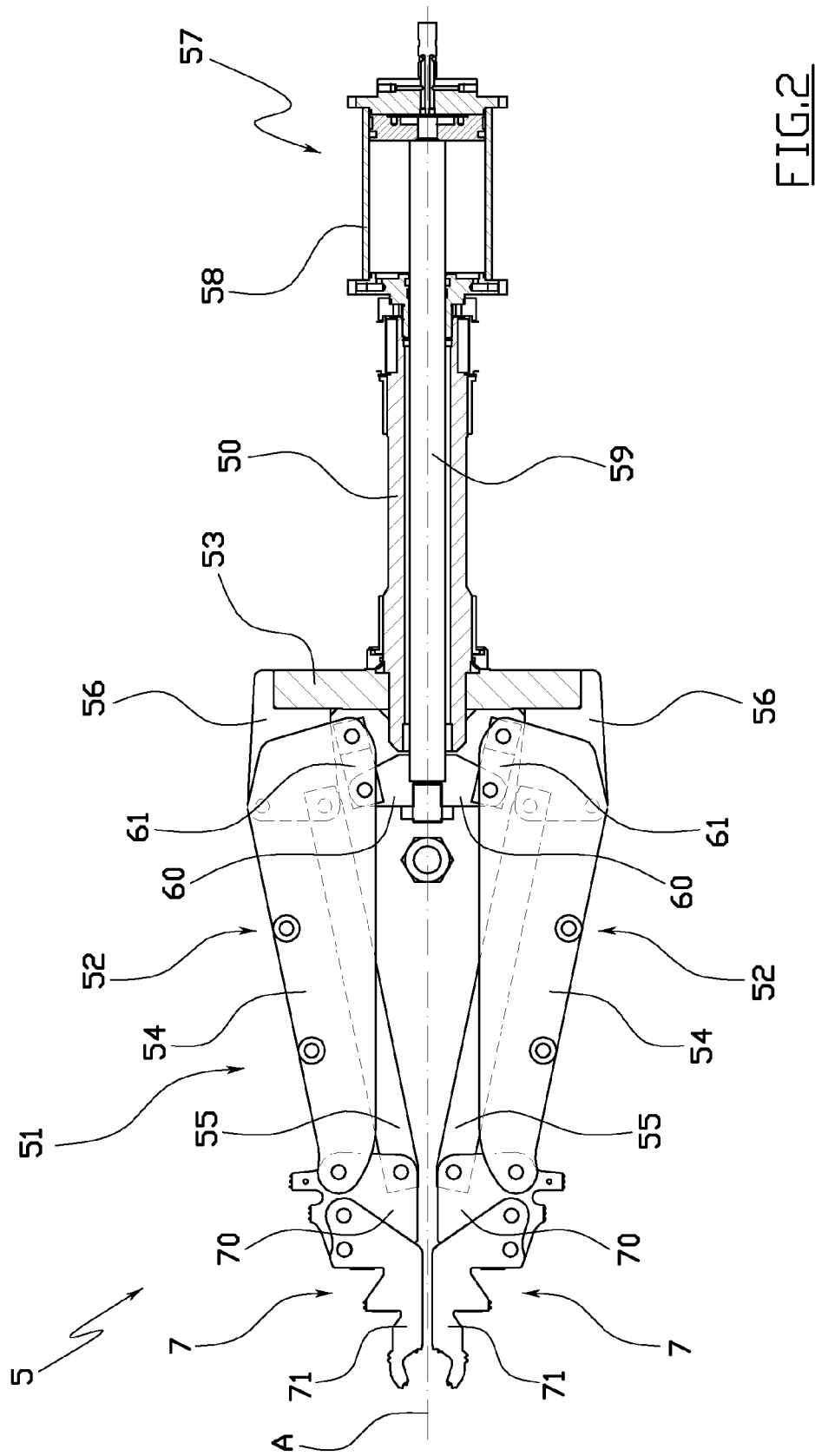
FIG. 2 is the section of the chuck of the machine of FIG. 1 according to a plane passing through the rotation axis.

As illustrated in FIG. 2, the blocking jaws 7 are connected to a single support disc 53 which is keyed onto the rotation shaft 50, each via a respective four-bar link 52.

Each four-bard link 52 comprises two arms 54 and 55 which are oriented in the direction of the rotation axis A of the chuck 5, front ends of which are hinged to the blocking jaw 7 while the back ends are hinged to a bracket 56 which is solidly constrained to the support disc 53. In particular, the first arm 54 is formed by two identical shaped plates, which are reciprocally separated by a hollow space in which both the bracket and the blocking jaw 7 are partially housed; the second arm 55 is a simple straight bar which is also partially housed in the hollow space between the shaped plates, and the ends of which are housed and hinged in a special seating afforded respectively in the blocking jaw 7 and the bracket 56. The hinge axes of the arms 54 and 55 are all parallel to one another, perpendicular and skewed (i.e. not coplanar) with respect to the rotation axis A of the chuck 5, such that the activating of the hinged triangle 52 produces a movement of the blocking jaw 7 having a radial component with respect to the rotation axis A.

In particular, the hinge axes of the arms 54 and 55 are arranged substantially at the corners of a parallelogram, so that during the above-cited displacement, the blocking jaw 7 is constrained to remain parallel to itself, maintaining the inclination thereof constant with respect to rotation axis A of the chuck 5.

The activation of the four-bar link 52 is performed by a single hydraulic jack 57, the cylinder 58 of which is fixed to the rotation shaft 50 of the chuck 5 at an opposite side with respect to the self-centring group 51, and the piston 59 of which is coaxially and slidaly inserted inside the rotation shaft 50 itself. The free end of the piston 59 projects with respect to the rotating shaft 50 and is provided with four angularly-equidistanced radial tabs 60, each of which is connected to the arm 54 of a respective four-bar link 52 via a con rod 61 having hinge axes which are parallel to those of the four-bar link 52 itself.

In this way, the alternating axial movement of the piston 59 causes all the arms 54 to oscillate simultaneously about the hinge axis with the respective bracket 56, contemporaneously activating all the four-bar links 52. As the four-bar links 52 are structurally identical, their simultaneous activation means that the blocking jaws 7 distance or alternatively near radially to the rotation axis A of the chuck 5 with equal displacements, remaining always arranged along a circumference centred in the rotation axis A.

As illustrated in FIGS. 3 and 4, each blocking jaw 7 comprises two distinct portions, of which a first connecting portion 70 to which the arms 54 and 55 of the relative four-bar link 52 are hinged, and a second portion 71 which is jointed to the first portion 70 via a hinge joint 72 which allows relative rotation of the second portion 71 with respect to the first portion 70. In particular, the second portion 71 exhibits a forked tract which houses, in an interposed position, a corresponding tract of the first portion 70, and the hinge joint 72 is formed by a pin inserted in three coaxial holes respectively afforded in the winds of the forked tract of the second portion 71 and the interposed tract of the first portion 70.

The hinge axis B defined by the hinge joint 72 is perpendicular and skewed with respect to the hinge axis of the arms 54 and 55 of the relative four-bar link 52, such that the rotation of the second portion 71 with respect to the first portion 70 modifies the overall dimension of the blocking jaw 7 in a radial direction with respect to the rotation axis A of the chuck 5.

In the present description the term "skewed" is taken to mean that the joint axis B is not coplanar with the rotation axis A and for this reason has no points in common therewith.

In particular, with respect to the first portion 70, the second portion 71 can assume a position of minimum radial development (denoted with an unbroken line in FIG. 4), in which the maximum distance D of the blocking jaw 7 with respect to the rotation axis A is at a minimum level, and a position of maximum radial development (denoted with a broken line) in which the maximum distance D of the blocking jaw 7 with respect to the rotation axis A is at a maximum level.

Each blocking jaw 7 is thus provided with relative means for fixing which block the second portion 71 in the above-mentioned positions of minimum and maximum radial development.

In the illustrated example, the means for fixing comprise two coaxial holes afforded in the wings of the forked track of the second portion 71, which are out-of-line with the joint axis B, and which contemporaneously receive a cylindrical bolt 73 which also inserts in a through-hole 74 or alternatively in a transversal gully 75 both afforded in the first portion 70, respectively when the second portion 71 is in the position of minimum radial development or in the position of maximum radial development (see FIG. 4).

Figure 6:
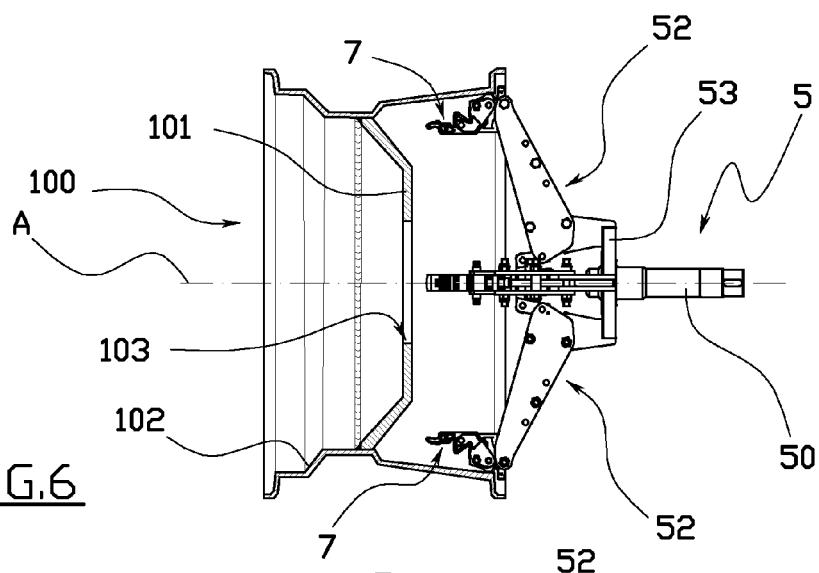

As illustrated in FIGS. 3 and 4, the first and the second portions of each blocking jaw 7 are conformed such that, when the second portion 71 is in the position of minimum radial development, the blocking jaw 7 exhibits overall a prevalent development in a parallel direction to the rotation axis A of the chuck 5; as well as a lateral diminishing step-shape development in a parallel direction to the rotation axis A of the chuck 5, each of which makes available a convex surface 76 which radially faces towards the outside in order to be in contact with the internal surface of the channel 102 of a rim 100 (see FIG. 6). The convex surface 76 exhibits a plurality of wedge-shaped projections 77 which are pressed against the surface of the wheel 100 in order to solidly engage the rim 100.

It is specified that in order to work with rims 100 made of light alloy, aluminium inserts (not illustrated) are included, hood-shaped, which removably insert on the steps of the blocking jaw 7 such as to cover the convex surfaces 76 and the relative projections 77, and which go into direct contact with the surface of the rim 100.

Figure 7:
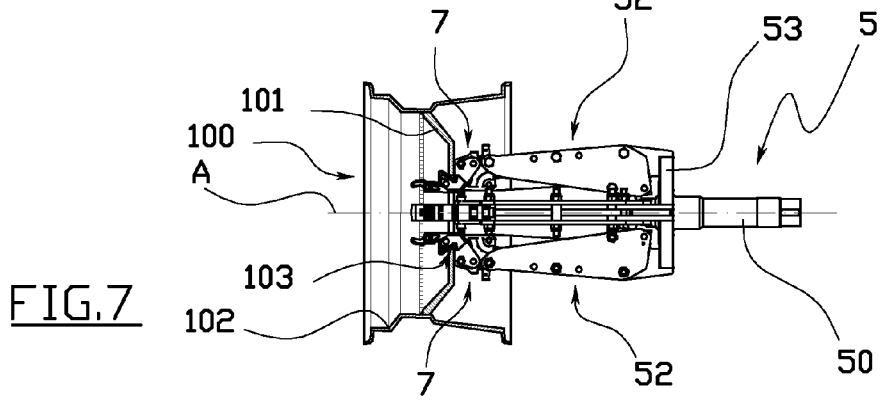

Between the above-mentioned steps, each blocking jaw 7 further exhibits a series of transversal gullies 78, also facing radially externalwards, which receive and solidly retain the edge of the central hole 103 of the disc 101 of a rim 100 (see FIG. 7). In particular, in order to prevent the disc 101 from scratching on contact with the vertical wall of the adjacent step, the disc 101 is provided with a plastic insert 79 which provides a softer contact surface.

Figure 5:
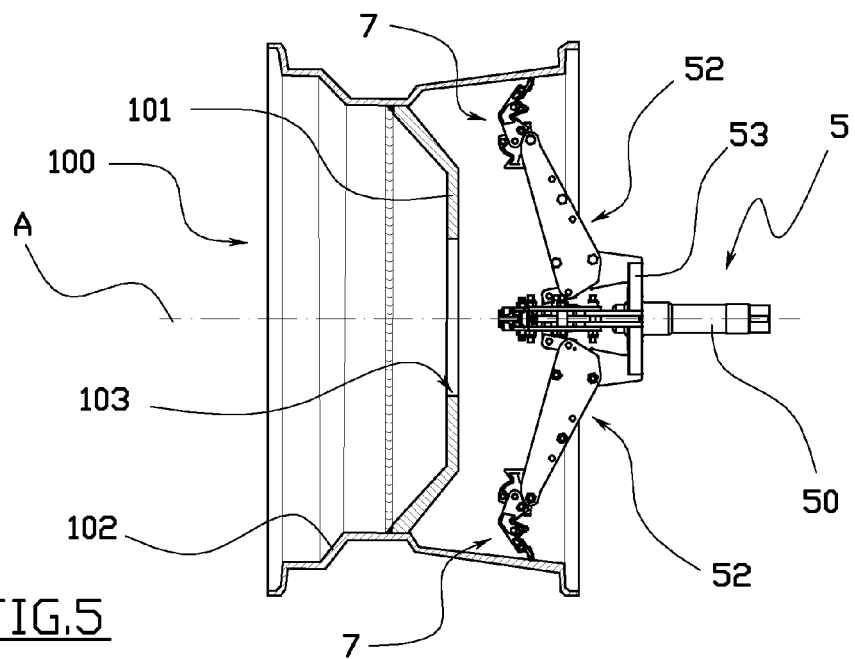
FIGS. 5, 6 and 7 shown the chuck of FIG. 2 coupled respectively to a 58-inch rim, a 48-inch rim and a 22-inch rim.

The first and the second portion of the blocking jaw 7 are further conformed such that when the second portion 71 is in the position of maximum radial development, the second portion 71 provides two convex surfaces 80, facing outwards and located a different distances with respect to the rotation axis A of the chuck 5, which are provided with relative wedge-shaped projections 81 which come in to contact with and are pressed against the internal surface of the channel 102 of a rim 100 (see FIG. 5).

In use, the wheel is neared to the tyre-changing machine 1 by an operator.

By rotating the adjustable frame 3 about the axis of oscillation C, the operator regulates the height of the chuck 5 from the ground, so as to place the rotation axis of the chuck 5 at the same height as and coaxial with the wheel axis. The wheel can also be raised from the ground with the aid of the special raising means.

On the basis of the diameter of the rim 100, the operator can thus choose whether to arrange the blocking jaws 7 of the chuck 5 in the configuration of minimum radial development, or in the configuration of maximum radial development.

In particular, for rims 100 having a diameter of up to about 52 inches, the operator can use the configuration of minimum radial development (see FIGS. 6 and 7). In this condition, on the basis of the shape of the rim 100 and his own preferences, the operator can choose whether to block the rim 100 at the channel 102 (see FIG. 6), or whether to grip the edge of the central hole 103 of the disc 101 (see FIG. 7).

If he chooses to block the channel 102, the operator activates the hydraulic jack 57 such as to radially near the blocking jaws 7 to the rotation axis A of the chuck 5, so that the jaws 7 can pass internally of the channel 102; then he will axially displace the wheel with respect to the chuck 5 up until a pre-selected convex surface 76 of the blocking jaw 7 is facing the internal surface of the channel 102; finally, he will newly activate the hydraulic jack 57 such as to radially distance the blocking jaws 7 from the rotation axis A of the chuck 5, up until the convex surfaces 76 press against the channel 102, solidly blocking the rim 100.

At this point the chuck 5 is set in rotation about the axis A, drawing the wheel with it, so that thanks to the movement of reciprocal nearing of the tool-bearing turret 34 and the projecting arm 35, the operator can first debead the tyre with the help of the debeader disc 40; then, after rotating the workhead 4, he can proceed to dismounting the tyre and remounting a fresh one using the tyre-changing tool.

In a case in which the rim 100 has a diameter of more than about 52 inches, and up to about 58 inches, the operator must arrange each blocking jaw 7 in the configuration of maximum radial development, simply by rotating the second portion 71 with respect to the first portion 70 and blocking them with the bolt 73, such as to turn the convex surfaces 80 radially externalwards.

As before, the operator then activates the hydraulic jack 57 such as to near the blocking jaws 7 radially to the axis of rotation A of the chuck 5, so that they can pass internally of the channel 102; then the operator will axially displace the wheel with respect to the chuck 5, up until a pre-selected convex surface 80 of the blocking jaws 7 faces the internal surface of the channel 102; finally, the operator will newly activate the cylinder-piston group such as to radially distance the blocking jaws 7 to the rotation axis A of the chuck 5, up until it presses the convex surfaces 80 against the channel 102, solidly blocking the rim 100.

When the wheel blocking stage has been completed, the functioning of the tyre-changing machine is similar to what has been described herein above. Obviously an expert in the sector might bring numerous modifications of a technical-applicational nature to the invention without its forsaking the ambit of protection as claimed herein below.

The invention claimed is:

1. A tyre-changing machine comprising a chuck (5) having a self-centring group (51) for blocking a rim (100) of a wheel, which self-centring group (51) comprises a plurality of blocking jaws (7) of the rim (100) arranged angularly equidistanced along a circumference centred on a rotation axis (A) of the chuck (5), and means for moving (52, 57) for radially distancing and nearing the blocking jaws (7) with respect to the rotation axis (A) of the chuck (5) such as to vary a diameter of the circumference on which the blocking jaws (7) are arranged while maintaining an inclination of each blocking jaw (7) constant with respect to the rotation axis (A) of the chuck (5), wherein each blocking jaw (7) comprises a first portion (70) which is connected to the means for moving (52, 57), and a second portion (71) which is movably coupled to the first portion (70) such as to be able to change an overall development of the blocking jaw (7) in a radial direction with respect to the rotation axis (A) of the chuck (5), and wherein the second portion (71) is coupled to the first portion (70) by means of a joint (72) for defining a reciprocal rotation axis (B).

2. The tire-changing machine of claim 1, wherein the reciprocal rotation axis (B) is perpendicular and skewed with respect to the rotation axis (A) of the chuck (5).

3. The tyre-changing machine of claim 1, wherein each blocking jaw (7) comprises means for fixing (73) for fixing the second portion (71) in at least two distinct operating positions with respect to the first portion (70).

4. The tyre-changing machine of claim 3, wherein when the second portion (71) is in a first operating position, the blocking jaw (7) develops in a prevalently parallel direction to the rotation axis (A) of the chuck (5), while when the second portion (71) is in the second operating position, the blocking jaw (7) exhibits a prevalently radial development with respect to the rotation axis (A) of the chuck (5).

5. The tyre-changing machine of claim 4, wherein the first portion (70) and the second portion (71) are conformed such that when the second portion (71) is in the first operating position, the blocking jaw (7) exhibits a shape having diminishing steps in a parallel direction to the rotation axis (A) of the chuck (5), which diminishing steps make available a plurality of surfaces (76) for contact with the rim (100).

6. A tyre-changing machine comprising a chuck (5) having a self-centring group (51) for blocking a rim (100) of a wheel, which self-centring group (51) comprises a plurality of blocking jaws (7) of the rim (100) arranged angularly equidistanced along a circumference centred on a rotation axis (A) of the chuck (5), and means for moving (52, 57) for radially distancing and nearing the blocking jaws (7) with respect to the rotation axis (A) of the chuck (5) such as to vary a diameter of the circumference on which the blocking jaws (7) are arranged while maintaining an inclination of each blocking jaw (7) constant with respect to the rotation axis (A) of the chuck (5), wherein each blocking jaw (7) comprises a first portion (70) which is connected to the means for moving (52, 57), and a second portion (71) which is movably coupled to the first portion (70) such as to be able to change an overall development of the blocking jaw (7) in a radial direction with respect to the rotation axis (A) of the chuck (5), wherein the second portion (71) is distinct from the first portion (70) and is movably coupled thereto for allowing a relative movement of the second portion (71) with respect to the first portion (70), and wherein each blocking jaw (7) comprises fastening means (73) for blocking the second portion (71) in at least two distinct operating positions with respect to the first portion (70).

* * * * *